United States Patent [19]

Joseph et al.

[11] Patent Number: 5,953,444
[45] Date of Patent: Sep. 14, 1999

[54] METHOD FOR IMPROVED CORRECTION OF SPECTRUM HARDENING ARTIFACTS IN COMPUTED TOMOGRAPHY IMAGES

[75] Inventors: Peter M. Joseph, Upper Darby, Pa.; Christopher Ruth, Danvers, Mass.

[73] Assignee: University of Pennsylvania, Philadelphia, Pa.

[21] Appl. No.: 08/955,673

[22] Filed: Oct. 22, 1997

[51] Int. Cl.$^6$ ..................................................... G06K 9/00
[52] U.S. Cl. ............................................. 382/131; 378/7
[58] Field of Search .................................. 382/131, 173, 382/275; 378/7, 8, 89, 98.11, 98.12, 901

[56] References Cited

U.S. PATENT DOCUMENTS

| | | | |
|---|---|---|---|
| 4,144,569 | 3/1979 | Wagner | 364/414 |
| 4,217,641 | 8/1980 | Naparstek | 384/414 |
| 4,222,104 | 9/1980 | Moore | 364/414 |
| 4,272,820 | 6/1981 | Lux | 364/414 |
| 5,414,622 | 5/1995 | Walters | 364/413.19 |
| 5,438,602 | 8/1995 | Crawford et al. | 378/4 |
| 5,528,644 | 6/1996 | Ogawa et al. | 378/8 |
| 5,644,610 | 7/1997 | Crawford et al. | 378/19 |

OTHER PUBLICATIONS

37th Annual Meeting, American Association of Physicists in Medicine, Joint Meeting with the Health Physics society, Hynes Convention Center, Boston, MA, Jul. 23–27, 1995.
Article, "Standardization of Computed Tomography Images by Means of a Material–Selective Beam Hardening Correction", P. Ruegsegger, Th. Hangartner, H.U. Keller, and Th. Hinderling, *Journal of Computer Assisted Tomography*, Apr. 1978, pp. 184–188.

Article, "An Improved Algorithm for Reprojecting Rays Through Pixel Images", Peter M. Joseph, *IEEE Transactions on Medical Imaging*, vol. MI–1, No. 3, Nov. 1982, pp. 192–196.

Article, "A Method for Simultaneous Correction of Spectrum Hardening Artifacts in CT Images Containing both Bone and Iodine", Peter M. Joseph and Christopher Ruth, Dept. of Radiology, University of Pennsylvania, *Medical Physics*, Oct. 21–22nd, 1997.

Abstract and Overhead presentation, "Simultaneous Correction of Bone and Contrast Beam Hardening Artifacts in CT", RSNA 1996, Scientific Program, Ruth, Peabody and Joseph, Dec. 1–6, 1996.

*Primary Examiner*—Andrew W. Johns
*Attorney, Agent, or Firm*—Duane Morris & Heckscher LLP

[57] ABSTRACT

The method disclosed herein includes the steps of providing a computed tomography image having a base component, a first component of a first material, and a second component of a second material, the first and second materials causing beam hardening artifacts, segmenting the image into different sections, each section containing one of the artifact-causing components, calculating thickness of components in one of the sections, calculating a correction factor to compensate for artifacts created by the artifact-causing component in the section, and adding the correction factor to the image and additionally, the providing step may include the step of providing raw image data, which can then be converted into image data representative of the computed tomography image.

15 Claims, 6 Drawing Sheets

METHOD FOR IMPROVED CORRECTION OF SPECTRUM HARDENING ARTIFACTS IN COMPUTED TOMOGRAPHY IMAGES

FIELD OF THE INVENTION

This invention relates generally to methods for Computed Tomography and, more particularly, to methods for improved correction of spectrum hardening artifacts in Computed Tomography images.

BACKGROUND OF THE INVENTION

Computed Tomography (hereinafter CT) is typically used in the diagnosis of tumors, hemorrhages and the localization of foreign objects within the human body. Additionally, CT can be used for qualitative imaging of abnormal pattens of blood flow. This technique could be especially useful for examination of the heart when myocardial infarction is known or suspected. In theory, the blood flow rate can be determined by injecting a contrast agent containing iodine or other high Z material into a person's vein, and then making a series of rapid x-ray computer tomography images of the heart. The resulting images could then be used to determine which parts of the heart are properly perfused with blood and the blood flow rate.

In practice, this technique cannot be used because of a phenomenon known as "beam hardening". Beam hardening occurs when more than one type of material is present in a scanned region, each of which have different energy dependent attenuation coefficients. Accordingly, the energy spectrum of the x-ray beam used to scan the patient is altered as the beam penetrates the patient's body. Because of the difference in energy spectra, the resulting images show distortions or so called "artifacts" that make interpretation of the images difficult.

While the beam hardening effect is routinely corrected in commercial CT scanners on the assumption that all materials in the body are approximately equivalent to water in their x-ray absorption characteristics, this assumption is known to be false, especially with regard to bones and iodine contrast agent. Accordingly, commercial CT scanners cannot compensate correctly for artifacts created by bone and iodine when both bone and iodine are present.

Thus, it would be desirable to have a method of correcting CT images to compensate for the artifacts created by bone and iodine when both bone and iodine are present.

SUMMARY OF THE INVENTION

The present invention provides a method comprising the steps of providing a computed tomography image having a base component, a first component of a first material, and a second component of a second material, the first and second materials causing beam hardening artifacts, segmenting the image into different sections, each section containing one of the artifact-causing components, calculating the thickness of components in one of the sections, calculating a correction factor to compensate for artifacts created by the artifact-causing component in the section, and adding the correction factor to the image. In addition, the providing step may include the step of providing raw projection data. This raw projection data can then be converted into image data representative of the computed tomography image.

Several benefits arise from providing such method. First, the inventive device disclosed herein can correct images distorted by the presence of multiple components which cause beam hardening. Further, unlike the prior art devices, the image data, instead of the raw projection, is used to reconstruct the corrected image. This is especially advantageous as the raw image data is between two and four times larger than the image data. Accordingly, less computer memory and resources are required.

It is the object of the present invention to provide a method for improved correction of spectrum hardening artifacts in CT images caused by at least two artifact-causing materials, such as bone and iodine.

Other objects and advantages of the present invention will become apparent after reading the detailed description of the present invention.

BRIEF DESCRIPTION OF THE DRAWINGS

The accompanying drawings illustrate preferred embodiments of the invention according to the practical application of the principles thereof, and in which.

DETAILED DESCRIPTION

The invention is now described with reference to the accompanying figures.

Figure 1:
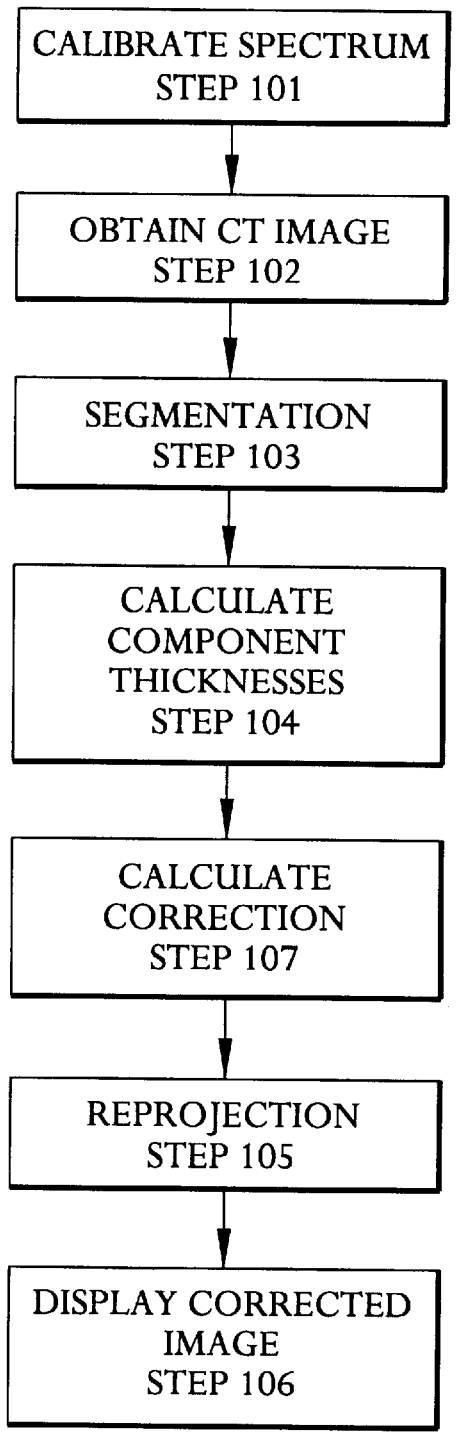
FIG. 1 is a flowchart representative of the inventive method.

A method which is capable of correcting artifacts CT images caused by beam hardening in a number of substances is shown in simplified form in FIG. 1. In the preferred embodiment, the method includes the following steps: calibration of the spectrum of the incident x-ray beam, Step 101; obtaining the CT image, Step 102; segmentation of the CT image, Step 103; calculation of each component thickness in the segmented image, Step 104; reprojection of the segmented image, Step 105; and finally displaying of the corrected image, Step 106.

Figure 2:
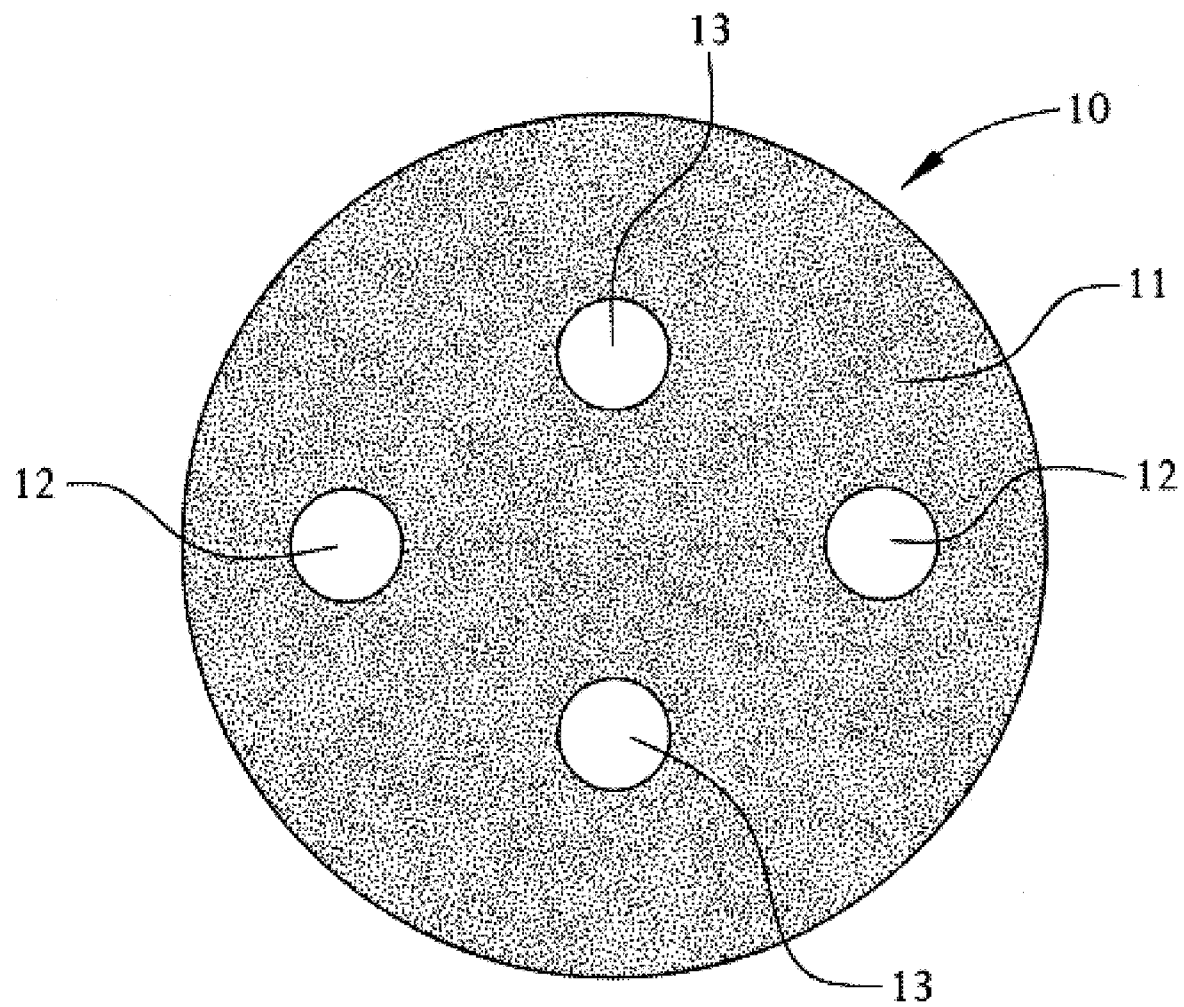
FIG. 2 illustrates a representative phantom.

Referring to FIG. 2, for exemplary purposes, there is shown a representative phantom sample 10 containing soft tissue 11, bone-equivalent components 12 and iodine components 13. The phantom sample 10 consists of a disk of water equivalent plastic (CIRS, Norfolk, Va.), 22.8 cm diameter and 5.0 cm thick, with four 2.5 cm diameter holes in which plastic tubes can be inserted. Two of the tubes, separated by 10.2 cm, were filled with a solution of iodinated contrast agent, Conray-60 (Mallinckrodt Medical, Inc., St. Louis, Mo.) and water. This solution contained 151 mg/ml of iothalamate meglumine ($C_{12}H_{26}N_3O_9I_3$). The other two tubes, separated by 15.2 cm, were filled with a solution of $K_2HPO_4$ and water with a concentration of 384 mg/ml. $K_2HPO_4$ was chosen since its mass attenuation coefficient has essentially the same energy dependence as bone mineral (i.e., calcium hydroxyapatite). Data was acquired for a 3 mm slice image through the center of the phantom sample 10.

Figure 3:
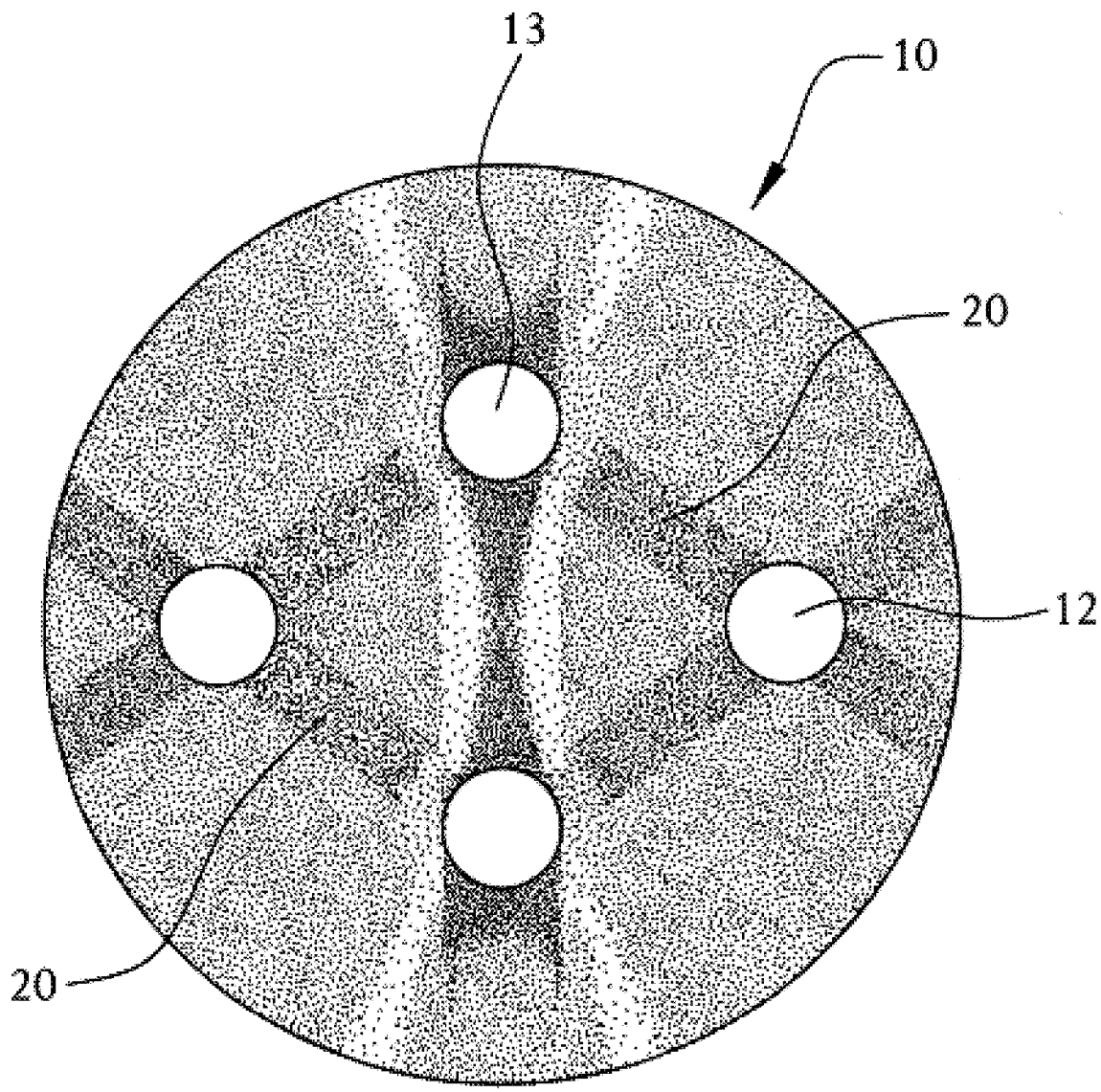
FIG. 3 displays the CT image of the phantom of FIG. 2.

The resulting CT image of the phantom sample 10 is shown in FIG. 3 before application of the corrective method disclosed herein. As shown, several artificial artifacts, visible as dark streaks 20, distort the image of the phantom sample 10. Similarly, in practice, when injected iodine passes through the chambers of the heart, it creates changes in the apparent density of the myocardium. Because these artifacts will be superimposed on those changes in density due to the passage of blood directly through the myocardium, and it will not be possible to demonstrate any abnormality in the myocardial perfusion. This problem is further compounded by the beam hardening artifacts created when the x-ray beam penetrate the patient's bones.

Before correction of the image artifacts is performed, the x-ray spectrum needs to be calibrated, Step 101. To properly compensate for the effects of beam hardening, the product of the energy spectrum function, S(E), and the detector efficiency E(E) has to be determined. It is preferable to measure the product directly rather than to attempt to measure the two components separately, thereby creating a transmission curve as a function of absorber thickness T. The equation which describes this process is theoretically given by:

$$F(T) = \int dE \, \exp(-\mu(E)T) S(E) \epsilon(E) \quad (1)$$

where $\mu$ is the energy dependent attention coefficient of the absorbers used, and is known from published tables.

Function F(T) could be recorded over a wide range of T, corresponding to at least two orders of magnitude in F, with a large number of thicknesses used. Preferably, the number of different thicknesses used should be at least 20.

The product of S(E) and $\epsilon$(E) can be estimated by inverting equation (1). In principle, this can be done by assuming the spectrum consists of a series of discrete spectral lines, so that the integral becomes a sum. As explained below, the number of spectral lines is not necessarily limited by the number of measurements. A possible method is to adjust the strength of each spectral line so that the sum of squares of differences between the predicted and measured data values is minimized. Such minimum least squares, or least chisquared, methods is very well known in numerical analysis.

However, this approach is problematic because it is "ill conditioned," i.e., which means that very subtle errors in the measured F(T) data reflect very large errors in the estimated spectrum. This error can be avoided by adding another term to the following chisquared formula:

$$X^2 = \Sigma (F(T_k) - D_k)^2 / \sigma^2 + \alpha \Sigma (\lambda_I - \lambda_{I+1})^2 \quad (2)$$

where the first sum is over the measurements indexed by k and the second is over the spectral parameters indexed by I. The second summation reduces the amount of variation in the estimated spectral parameter. Parameter $\alpha$ is adjusted empirically, i.e., if it is too small, the spectrum will show unrealistic oscillations; if it is too large, the value of $X^2$ will rise, indicating an unacceptable fit to the data. Preferably, a person would start with a very low $\alpha$ so that $X^2$ is as small as possible. The person can then increase $\alpha$ until X increases about 20%.

A person can provide two regularization terms, i.e., one above and one below the energy of the K-shell of the target material. For example, if tungsten is the x-ray target, then the two sums should span the energy range less than 69 keV and above 69 keV, respectively. This is necessary to accommodate the sharp drop in the spectrum that is produced by self absorption of x-rays in the target.

It is preferable to use absorber materials with different high atomic numbers. For example, copper and aluminum are a useful pair to use. By using this pair, obtain two sets of transmission data are obtained which then can be combined, fitting the algorithm described above.

This method, however, is not designed to provide energy spectra estimates of high energy resolution. Instead, an energy resolution of about 10–20 keV is obtainable.

The second step in the preferred method of FIG. 1 is obtaining a CT image, Step 102. According to the equipment used, the obtained CT raw image data will probably be organized in a "fan-beam" geometry, where the data is dependent on the position of the sensors.

In order to simplify the computations to be effected later, it is preferable to convert the fan-beam raw image data to parallel geometry image data. The parallel geometry will be easier to manipulate. A person skilled in the art can write a program, such as the one attached as an appendix, to conduct such a conversion. Of course, each program will be machine-specific. For example, the attached program is to be used with the Evolution EBT scanner machine developed by Imatron Corporation of South San Francisco, Calif., which has fourth generation fan-beam geometry. Nevertheless, the general concepts are applicable to any fan-beam scanner.

Since the method described is applied to the reconstructed image, and since it applies to fundamental physics processes that act to alter the x-ray spectrum upon penetrating the patient's body, there is no need to require that the reprojected rays follow the geometry of the original scanner. In particular, it is usually simpler to do the correction using parallel beam geometry in which ally rays in a given view are parallel. From the image one obtains direct estimates of the x-ray attenuation coefficients in the different pixels, and from the known pixel and image sizes, one obtains distances, so the integrals of density and distance are computable for any geometry. The delta image method calculates only the changes needed in the image and does not require any comparison with the original raw data.

After a CT image is obtained, the image must be segmented into bone and iodine components, Step 103. In the prior art, when correcting beam hardening artifacts in bones, it was sufficient to identify the bone component by a simple threshold technique applied to the reconstructed CT number. Accordingly, values greater than threshold were assumed to be bone rather than soft tissue.

However, when more than one beam hardening component is present, such as bone and iodine, it is necessary to distinguish between the two, i.e., to segment the two components. However, segmentation cannot be based on CT number alone, since in some cases bone will have a CT number greater than iodine and in some cases it will be the reverse.

Segmentation can be made on the basis of a priori knowledge of anatomy. For example, when it is desired to apply the beam hardening correction to a CT scan of the chest which includes a portion of the heart, a person can distinguish between the bone and iodine components because all bones lie near the outer surface of the thorax, while the important iodine concentrations will be in the heart chambers and great blood vessels.

Segmentation can be implemented in several ways. For example, a user could indicate manually where the outer limits of the iodine concentration lies by using a standard computer trackball technology. The user would just trace a curve inside the chest wall. One simple method of segmentation would be to assume that an elliptical curve, or pseudo-elliptical curve, can be constructed to segment the outer portions of the chest cross-section (which includes all bones) from the inner portion (which includes most major concentrations of iodinated blood). An appropriate equation for a pseudo-ellipse could be of the form:

$$((x-x_0)/a)^n + ((y-Y_0)/b)^n = 1$$

where n is a positive parameter, usually at least 2. The parameters n, $x_0$, and $Y_0$ would be adjusted empirically to segment the chest into the inner and outer regions as described above.

Segmentation could also be automated by having the computer trace inward from the outer surface until lung tissue is reached. Accordingly, the limits of the outer tissue would be defined. An exception could be programmed for rays that pass through the mediastinum or vertebrae, in which case the outer region would end when the region of high bone density was penetrated.

The next step is to calculate the component thicknesses, Step 104. In theory, if $I_L$ is the intensity of x-rays detected on a given line L, then:

$$I_L = \int S(E) \exp(-(m_w T_w + m_b T_b + m_I T_I)) dE \qquad (3)$$

where S(E) is the spectral density at photon energy E, $m_I$ is the mass attenuation coefficient for substance I at energy E, and $T_I$ is the "thickness density product" (TDP) of substance I along line L. $T_I$ can then be expressed as a line integral of density of the substance I along line L:

$$T_i = \int_L \rho_i(x,y) ds \qquad (4)$$

where "i" stands for either water, bone, or iodine.

After the thicknesses are calculated, the image can be reprojected to eliminate or minimize the effects of beam hardening can be calculated, Step 105. Effective density $\rho_e$ is defined as the ratio of absolute CT numbers of the pixel in question to water, i.e., $$\rho_e = CT(\text{object}) * (1 \text{ gm/cc}) / CT(\text{water}), \qquad (5)$$

where CT( ) is defined as the Hounsfield Units (HU) plus 1000, so that vacuum has the value of zero and water has the value of 1 gm/cc.

If the substance is water equivalent, i.e., if its effective atomic number matches that of water, then $\rho_e$ is the mass density in grams/cc. However, objects with effective Z larger than that of water will reconstruct with increased CT numbers for a given density due to their increased x-ray attenuation coefficient. For example, if both bone and iodine are present then:

$$\rho_e = \rho_w + \lambda_b \rho_b + \lambda_I \rho_I \qquad (6)$$

where the dimensionless parameter $\lambda_I$ represents the factor by which the attenuation of one gram/cc of substance I exceeds that of one gram/cc of water. $\lambda$ depends on the energy spectrum of the exiting photon beam and is given approximately by:

$$\lambda_I \approx <\mu/\rho>_I / <\mu/\rho>_w \qquad (7)$$

Accordingly, each $\lambda_I$ is the ratio of the mass attenuation coefficients of substance I and water, averaged over the energy spectrum of the detected beam. Equation (7) must be considered only approximate, however, because the energy spectrum used will depend on the materials along each path due to the spectrum hardening effect. Nevertheless, it shows how the spectrum changes can affect equation (6).

Because $\lambda_I$ depends on the thicknesses of materials along the path, and in particular on $T_I$ due to beam hardening, the line integral of $\rho_{e''}$ $$T_e = \int \rho_e ds = T_w + \lambda_b T_b + \lambda_I T_I \qquad (8)$$

will contain nonlinear terms in the various $T_I$. This nonlinear aspect of the beam hardening problem is known to create streak artifacts in the region between regions of high concentration of high Z materials, such as the "interpetrous lucency" seen in head scans.

However, beam hardening in any pure substance, such as water, can always be corrected exactly by using a non linear function to relate the measured intensity I to the TDP. Thus, for water, $$T_e = H^{-1}(I/I_0), \qquad (9)$$

where $I_o$ is the detected intensity with no absorbers and $H^{-1}$ is the inverse of the function H, defined as:

$$H(T) = \int S(E) \exp(-m_w T) dE. \qquad (10)$$

In other words, H(T) is the detected intensity for a polyenergetic beam passing through T grams/cm² of water equivalent substance.

Thus, it is preferable to first estimate the distribution of true densities for each pixel within the image from knowledge of the effective densities and a priori knowledge of the nature of the substance in each pixel. If a pixel is known to contain a substance I, having a known mass attenuation coefficient, its density can be estimated as:

$$\rho_I(x,y) \approx \rho_e(x,y)/\lambda_{I,1}, \qquad (11)$$

where x,y are the coordinates of a particular pixel and $\lambda_{I,1}$ is a preliminary estimate of the $\lambda$ for the substance in that pixel.

Accordingly, the correction algorithm is formulated in terms of subtracting off the nonlinear terms $\lambda_I T_I$ in equation (8), and replacing them with terms in which the $\lambda$'s are made to be constant. In this way, the nonlinear aspects of the problem and the BHA are eliminated. For example, for bone, the corrected TDP projection data is given by $$T_2 = T_e - \lambda_b T_b + \lambda_2 T_b = T_e + (\lambda_2 - \lambda_b) T_b \qquad (12)$$

where $\lambda_2$ is a constant that can be chosen freely. Preferably, a person will choose $\lambda_2$ to be approximately equal to the average value of $\lambda$ determined in the original scan, or from a theoretical estimate using equation (7).

Since $\lambda_2$ will obviously directly determine the magnitude of the CT number for bone-like quantities in the corrected image, it will also determine the effective energy in the corrected image. For example, if $\lambda_2$ is set to zero, then bones will appear to have zero density after reconstruction, which corresponds to an infinite effective energy. As discussed below, this could provide an advantageous result.

The value of $\lambda_b$ must be determined for each ray as needed for equation (12). This can be done by solving numerically the following equation:

$$H(T_w + \lambda_b T_b) = \int S(E) \exp(-(m_w T_w + m_b T_b)) dE. \qquad (13)$$

The integral can be computed numerically with $\Delta E = 1$ keV. An energy spectrum equivalent to S(E) can be determined from transmission measurements as discussed above. The mass attenuation coefficients can be obtained from published data.

All TDP values can thus be determined from the initial image-based estimates by numerical integration of pixel values (Eq. (4)). Then, the value of $\lambda_b$ needed to satisfy equation (13) can be determined by Newton's method.

The method described by equation (13) cannot be applied easily to more than one high Z substance, since no method is specified for independently determining the two unknowns $\lambda_b$ and $\lambda_I$. However, based upon a generalization which does not require explicit calculation of the $\lambda$'s and can be used, in principle, for any number of high Z substances, the correction equation is:

$$T_2 = T_e - \Delta + \lambda_{b,2} T_b + \lambda_{I,2} T_I \quad (14)$$

where $\Delta$ is defined by numerically solving the equation $$H(T_w + \Delta) = \int S(E) \exp(-(m_w T_w + m_b T_b + m_I T_I)) dE. \quad (15)$$

As discussed above, the constants $\lambda_{b,2}$ and $\lambda_{I,2}$ are chosen freely and establish the effective energy at which bone and iodine will appear in the corrected image. Preferably, the values of $\lambda_{I,2}$ and $\lambda_{b,2}$ are chosen to minimize the fractional change in T due to the correction, i.e., minimize $|T_2 - T_e|/T_e$. This is because, while the reduction of BHA are not dependent on the choice of $\lambda_{I,1}$ and $\lambda_{b,2}$ other artifacts may become visible if they are too large or small.

Also, the correction algorithm does not require the raw projection data but starts with a reconstructed image which has been processed with a 'soft tissue' beam hardening correction (i.e., Eq. (9)). This is convenient since most CT scanners utilize an intrinsic correction for soft tissue. Accordingly, it is not necessary to reproduce the geometry of the original scanner during the reconstruction process.

It is also not necessary to reproject the entire image. A reconstruction of the corrected rays, $T_2$ in Eq. (14), can be thought of as the sum of two separate reconstructions. For example, if R(T) represents the reconstructed image using the set of projections T, the corrected image, $R(T_2)$, is then given by $$R(T_2) = R(T_e) + R(\delta T) \quad (16)$$

where R ($T_e$) is the uncorrected image and $$\delta T = -\Delta + \lambda_{b,2} T_b + \lambda_{I,2} T_I. \quad (17)$$

Thus the corrected image can be obtained by reconstructing only those rays which intersect bone or iodine and adding the result to the original image. In the reconstruction of $\delta T$ all rays which do not intersect iodine/bone are set to azero. This method is desirable because of its faster processing time.

The inventors practiced the above-described correction algorithm on an Evolution EBT scanner. Accordingly, the original image produced by the scanner, i.e., a 512 by 512 integer pixel array in Hounsfield units, was converted to units of effective density $\rho_e$ using Eq. (5). The reprojection was then performed by interpolating the value of $\rho_e$ at any point along a ray between adjacent pixel points. A parallel detector (i.e., first generation) geometry was used in the reprojection with 720 detector angles and 1,111 rays per detector. The detector angles spanned 180 degrees with a spacing of 0.25 degrees. The spacing of the reprojected rays was chosen to be approximately equal to the original pixel spacing.

A simple geometric cut was used to identify the iodine and bone in the phantom sample 10 of FIG. 2. The iodine solution was treated as a mixture of IM and water.

Accordingly, if a ray intersected iodine, $T_I$ and $T_{WI}$ would be the TDP of IM and water respectively. That is, $$T_I = \int \rho_I ds$$

$$T_{wI} = \int \rho_{wI} ds \quad (18)$$

where $\rho_I$ is the density of IM in the solution (i.e., grams IM per cc of solution) and $\rho_{WI}$ is the density of water in the solution. In general, $\rho_I$ and $\rho_{WI}$ will be functions of the reconstructed density, $\rho_e$ which must be determined experimentally. This can be done by measuring the CT number for several known concentrations of contrast to obtain the functions $\rho_I(\rho_e)$ and $\rho_{WI}(\rho_e)$.

The above discussion is also applicable to bone components. $T_b$ and $T_{Wb}$ are defined to be the TDP of $K_2HPO_4$ and water respectively and $\rho_b(\rho_e)$ and $\rho_{Wb}(\rho_e)$ to be the corresponding solution densities. If a pixel along the reprojected ray does not contain iodine or bone, it is classified as soft tissue:

$$T_s = \int \rho_e ds. \quad (19)$$

The total TDP of water equivalent material along the ray, $T_w$ in Eq. (15), is then $$T_w = T_s + T_{wI} + T_{wb}. \quad (20)$$

Finally, it is preferable to set the thresholds for iodine and bone identification to one half the average value of $\rho_e$ for these substances. A possible alternative is to provide a varying, or "floating," threshold, in order to accommodate different concentrations of iodine.

For the phantom sample 10 when scanned on the evolution EBT as described above, the values of $\lambda_{I,2}$ and $\lambda_{b,2}$ were chosen to be 10.5 and 1.5 respectively. Using these values the maximum factional change, $\delta T/T$, was $\approx 2\%$ for rays traversing both iodine tubes and $\approx 05\%$ for rays traversing both bone tubes. Theoretical estimates for $\lambda$ using Eq.(7) are shown in FIGS. 7 and 8. Since the averages in Eq.(7) depend on the amount of spectral hardening, the lambdas were computed as a function of water thickness $T_w$. In other words, the spectrum used for averaging was hardened by $T_w$ gm/cc of water.

Ultimately, the chosen value of $\lambda_{b,2}$ corresponds to a water thickness which is approximately equal to the diameter of the phantom ($\approx 23$ cm). The experimental value of $\lambda_{I,2}$ is obtained with $T_w \approx 40$ cm. This extra hardening is due to the ray traversing the iodine as well as water.

Figure 4:
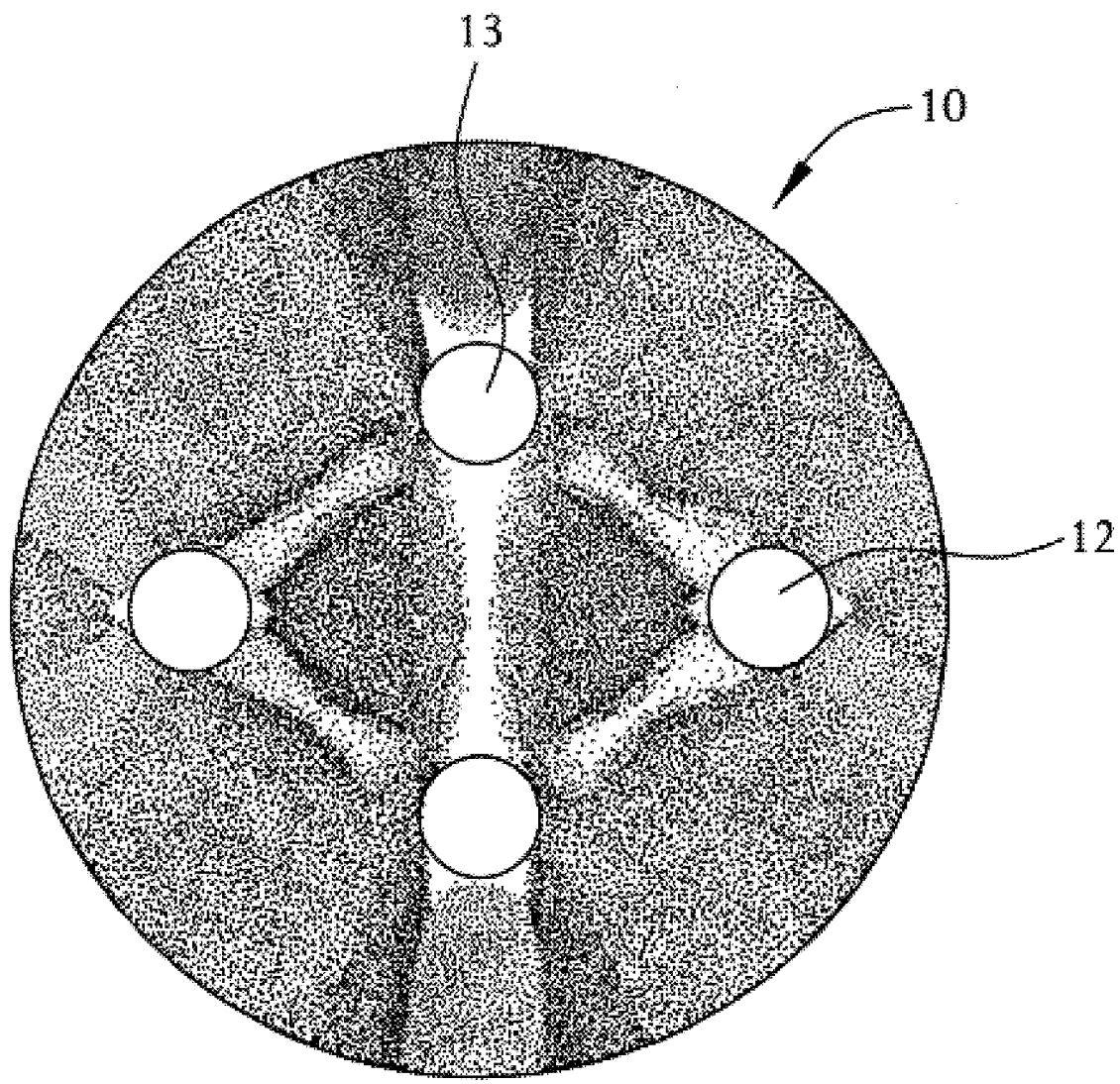
FIG. 4 displays the $\delta$-image for the CT image of FIG. 3.
Figure 5:
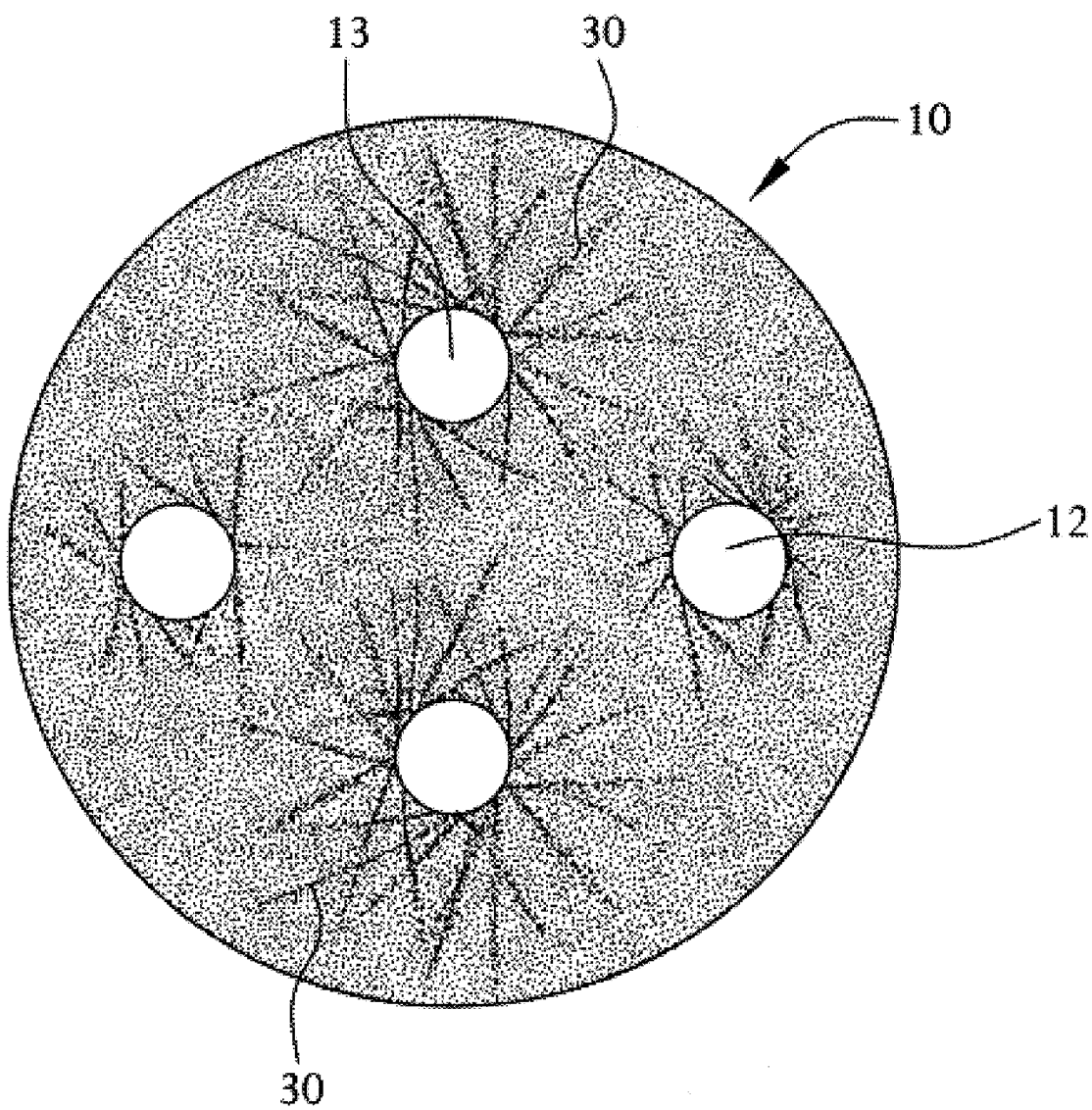
FIG. 5 displays the reconstructed phantom image.

Accordingly, based on the above algorithm and values, the distorted image shown in FIG. 3 can be combined with the calculated $\delta$-image shown in FIG. 4 to form the reconstructed image shown in FIG. 5. The thin streaks radiating from the iodine and, to a lessor extent, the bone are due to errors intrinsic to the scanner and not related to beam hardening. However, these streaks are reported to have been corrected for in the latest version of the Evolution scanner's software.

Figure 6:
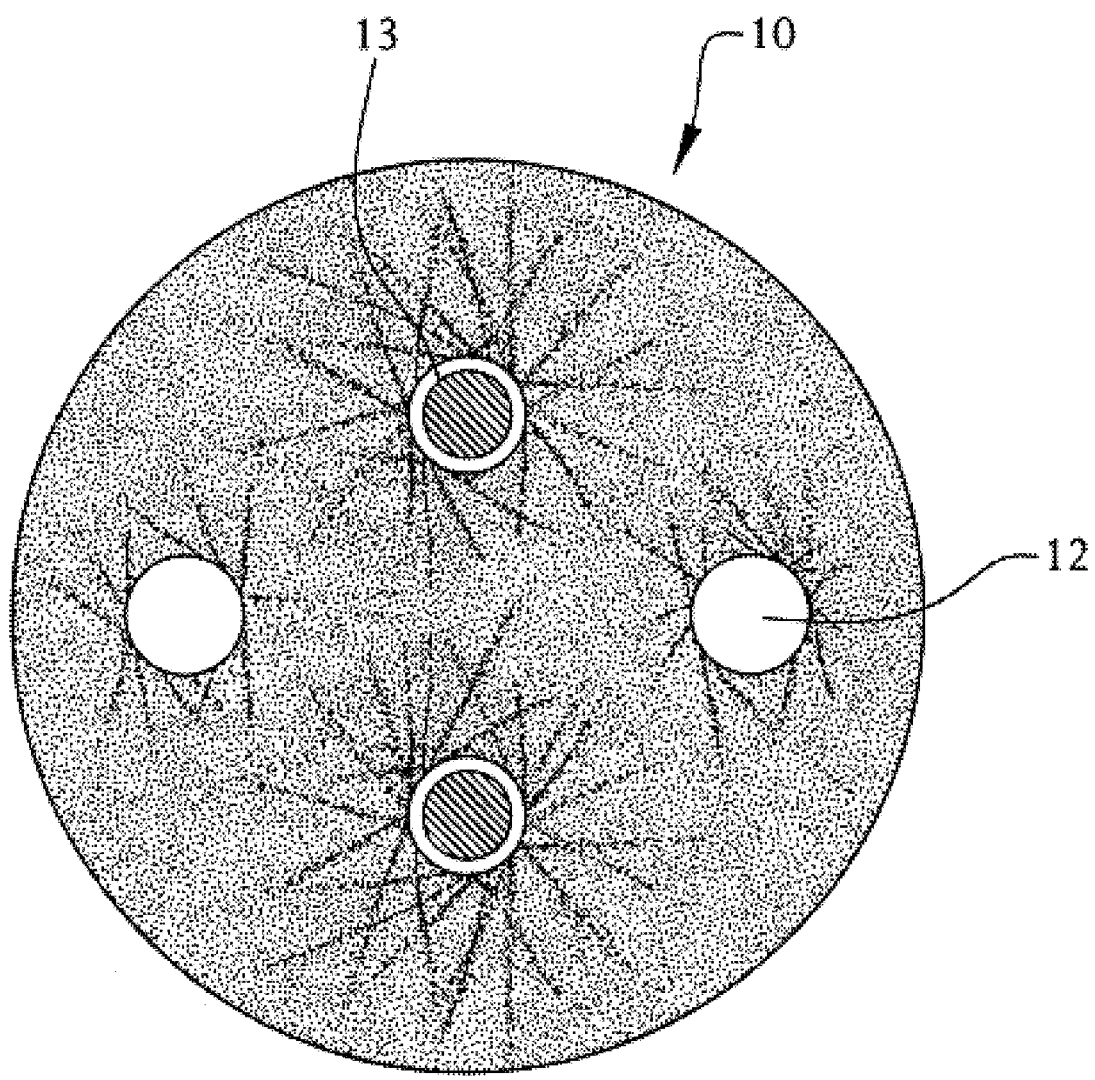
FIG. 6 displays a reconstructed image of the phantom of FIG. 1 when $\lambda_{I,2}$ and $\lambda_{b,2}$ are set to zero.

As mentioned above, if $\lambda_{I,2}$ and $\lambda_{b,2}$ are set to zero, a possibly advantageous result can occur, as shown in FIG. 6. As shown, the iodine components are darkened. Accordingly, a person can thus easily distinguish between bone and iodine components.

Nevertheless, if the lambdas are set to zero, some of the very fine streaks which are visible in the other images appear to be intensified. These artifacts are probably attributable to errors created in the reprojection process, i.e. errors in estimating $T_I$ or $T_b$. For example, as seen in equation 12, any error in $T_b$ will be multiplied by the factor $(\lambda_2 - \lambda_b)$. Thus by choosing $\lambda_{I,2}$ and $\lambda_{b,2}$ close to the natural values one minimizes the effects from errors in estimating $T_I$ and $T_b$.

Persons skilled in the art may recognize other steps that can be added to the embodiment described above. Similarly, persons skilled in the art may recognize other alternatives to the steps or equations disclosed herein. However, all these additions and/or alterations are considered to be within the scope of the claims underneath.

What is claimed is:

1. A method for correcting computed tomography images comprising the steps of:

providing a computed tomography image having a base component, a first component of a first material, and a second component of a second material, the first and second materials causing beam hardening artifacts;

segmenting the image into different sections, each section containing one of the artifact-causing components;

calculating thickness of components in one of the sections;

calculating a correction factor to compensate for artifacts created by the artifact-causing component in the section; and adding the correction factor to the image.

2. The method of claim 1, wherein the providing step further comprises the step of scanning a region.

3. The method of claim 1, further comprising the step of determining energy spectrum of scanning rays.

4. The method of claim 1, wherein the providing step further comprises the step of providing raw image data.

5. The method of claim 4, wherein the providing step further comprises the step of converting the raw image data into image data representative of the computed tomography image.

6. A method for correcting computed tomography images comprising the steps of:

providing a computed tomography image having a base component, a first component of a first material, and a second component of a second material, the first and second materials causing beam hardening artifacts;

segmenting the image into different sections, each section containing one of the artifact-causing components;

calculating thickness of components in the sections;

calculating correction factors to compensate for artifacts created by the artifact-causing components in the sections;

compiling the correction factors to form an intermediate image; and adding the intermediate image to the image.

7. The method of claim 6, wherein the providing step further comprises the step of scanning a region.

8. The method of claim 6, further comprising the step of determining energy spectrum of scanning rays.

9. The method of claim 6, wherein the providing step further comprises the step of providing raw image data.

10. The method of claim 9, wherein the providing step further comprises the step of converting the raw image data into image data representative of the computed tomography image.

11. A method for correcting computed tomography images comprising the steps of:

providing a computed tomography image having a soft tissue component, an iodine component and a bone components, the iodine and bone components causing beam hardening artifacts;

segmenting the image into different sections, each section containing one of the artifact-causing components;

calculating thickness of components in the sections;

calculating correction factors to compensate for artifacts created by the artifact-causing components in the sections;

compiling the correction factors to form an intermediate image; and adding the intermediate image to the image.

12. The method of claim 11, wherein the providing step further comprises the step of scanning a region.

13. The method of claim 11, further comprising the step of determining energy spectrum of scanning rays.

14. The method of claim 11, wherein the providing step further comprises the step of providing raw image data.

15. The method of claim 14, wherein the providing step further comprises the step of converting the raw image data into image data representative of the computed tomography image.

* * * * *